(12) United States Patent
Guionnet

(10) Patent No.: US 8,666,793 B2
(45) Date of Patent: Mar. 4, 2014

(54) DISTRIBUTING REAUTHORIZATION TIME IN THE EVENT OF TARIFF TIME CHANGE

(75) Inventor: Jerome Guionnet, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 1512 days.

(21) Appl. No.: 11/855,815

(22) Filed: Sep. 14, 2007

(65) Prior Publication Data

US 2009/0076984 A1 Mar. 19, 2009

(51) Int. Cl.
*G06Q 10/00* (2012.01)
*G06F 17/00* (2006.01)
*G06G 7/00* (2006.01)

(52) U.S. Cl.
USPC .................. 705/7.12; 705/1.1; 705/400

(58) Field of Classification Search
USPC ......... 705/1.1, 7.11–7.42, 26.1, 26.35, 26.41, 705/304, 325, 348, 400
See application file for complete search history.

(56) References Cited

U.S. PATENT DOCUMENTS 5,901,138 A * 5/1999 Bader et al. .................. 370/229
6,667,978 B1 * 12/2003 Delp et al. ................. 370/395.1

* cited by examiner

*Primary Examiner* — George Chen
(74) *Attorney, Agent, or Firm* — Kilpatrick Townsend & Stockton LLP

(57) ABSTRACT

Embodiments of the present invention provide techniques for distributing the timing of reauthorization requests. In one embodiment, a request to authorize a subscriber of a service to consume a quantity of the service is received and a delay time period is calculated. The delay time period is based on the resources available to the subscriber (e.g., remaining balance in a subscriber account, credit limit, etc.), and/or other configurable thresholds. The subscriber is then authorized to consume the quantity of service over a period of time extending to the time of a service pricing change, plus the delay time period. In this manner, network spikes resulting from the receipt of multiple, simultaneous reauthorization requests at the times of service pricing changes are avoided, without increasing the credit risk to the service operator/provider.

18 Claims, 5 Drawing Sheets

DISTRIBUTING REAUTHORIZATION TIME IN THE EVENT OF TARIFF TIME CHANGE

BACKGROUND OF THE INVENTION

Embodiments of the present invention relate to event processing, and more particularly relate to techniques for distributing the timing of reauthorization requests.

Many service operators/providers in the fields of telecommunications, content delivery, and the like operate event processing systems to manage the billing and service access of end-users (e.g., subscribers). One of the functions performed by these systems is known as subscriber authorization and reauthorization. In a typical authorization transaction, a subscriber (or an intermediary on behalf of the subscriber) submits an authorization request to consume a quantity of the service. If the subscriber has sufficient resources, the system authorizes the subscriber to consume the quantity over a period of time (i.e., validity time period). A reauthorization request may be subsequently submitted if, for example, the subscriber has fully consumed the granted quantity, or if the validity time period has expired.

Generally speaking, the validity time period of a granted quantity of service will extend to the time of a service pricing change (i.e., tariff change), as defined by a pricing configuration of the service. At the time of the service pricing change, the granted quantity will expire. For example, consider a pricing configuration for an Internet access service where the service price is $1.00 per megabyte (MB) from 8:00 AM to 6:00 PM, and $0.10 per MB from 6:00 PM to 8:00 AM. If a subscriber makes an authorization request at 7:30 AM to consume 1 MB of data, the request will be granted at the service price of $0.10 per MB for a validity time period of thirty minutes (i.e., until 8:00 AM—the time at which the service price changes). At 8:00 AM, the subscriber will generally have to submit a reauthorization request to ask for a new quantity at the $ 1.00 per MB price if the subscriber is still active on the network.

For a given service, it is common for many subscribers to be associated with the same pricing configuration. As a result, a large number of reauthorization requests may be received simultaneously at the time of a service pricing change. This creates an undesirable spike in network traffic to the system at those times, thereby reducing overall system performance, responsiveness, and reliability.

A known solution to the above problem is to increase the processing capacity of the event processing system. For example, additional processing power, network bandwidth, and the like may be added to increase the number of authorizations/reauthorizations the system can process at a given time. However, this approach can be very costly for a service operator/provider, particularly if the subscriber base of the service operator/provider is large. Further, this approach is inefficient because the extra processing capacity is only necessary to handle the spikes in reauthorization requests received at the times of service pricing changes. At other times the load on the event processing system will be relatively low, and thus the extra capacity will go unused.

BRIEF SUMMARY OF THE INVENTION

Embodiments of the present invention address the foregoing and other such problems by providing techniques for distributing the timing of reauthorization requests. In one embodiment, a request to authorize a subscriber of a service to consume a quantity of the service is received and a delay time period is calculated. The delay time period is based on the resources available to the subscriber (e.g., remaining balance in a subscriber account, credit limit, etc.), and/or other configurable thresholds. The subscriber is then authorized to consume the quantity of service over a period of time extending to the time of a service pricing change, plus the delay time period. In this manner, network spikes resulting from the receipt of multiple, simultaneous reauthorization requests at the times of service pricing changes are avoided, without increasing the credit risk to the service operator/provider.

According to one embodiment of the present invention, a method for distributing the timing of reauthorization requests comprises receiving a request to authorize a subscriber of a service to consume a quantity of the service, where a cost of consuming the quantity of the service at the time of receiving the request is C1; determining a time of a service pricing change, where a cost of consuming the quantity of the service after the time of the service pricing change is C2; and determining a quantity of resources available to the subscriber, where the quantity of resources is at least C1. The method further comprises calculating a delay time period for the subscriber based on the quantity of resources available to the subscriber, and authorizing the subscriber to consume the quantity of service. In various embodiments, the authorization is valid for a time period up to the time of the service pricing change plus the delay time period, thereby delaying a time of receipt of a reauthorization request for the subscriber beyond the time of the service pricing change by the delay time period. In further embodiments, an amount equal to C1 may be reserved from the quantity of resources available to the subscriber.

In some embodiments, the step of calculating the delay time period for the subscriber based on the quantity of resources available to the subscriber comprises determining a minimum threshold value and a maximum delay time period. If the quantity of resources is greater than the minimum threshold value, the delay time period is set to the maximum delay time period. If the quantity of resources is less than the minimum threshold value, the delay time period is calculated as a function of the quantity of resources, the minimum threshold value, and the maximum delay time period.

In further embodiments, the step of calculating the delay time period as a function of the quantity of resources, the minimum threshold value, and the maximum delay time period comprises calculating a ratio by dividing the quantity of resources by the minimum threshold value. The delay time period is then calculated by multiplying the ratio by the maximum delay time period.

In one set of embodiments, the minimum threshold value and maximum delay time period are manually configurable by a user such as an administrator. In other embodiments, the minimum threshold value and maximum delay time may be calculated based upon various criteria. For example, the minimum threshold value may be calculated based on the cost of consuming the quantity of the service at the time of receiving the authorization request and the cost of consuming the quantity of the service after the time of the service pricing change.

In some embodiments, the resources available to a subscriber correspond to currency, such as dollars. Alternatively, the resources available to a subscriber may correspond to non-monetary quantities such as units of service (e.g., free minutes of wireless phone service). In one embodiment, the available resources are represented as a balance in an account of the subscriber.

In some embodiments, the time of the service pricing change may be predetermined, such as a certain time of day.

In other embodiments, the time of the service pricing change may change dynamically based on various criteria, such as a quality of the service.

According to another embodiment of the present invention, a system for distributing the timing of reauthorization requests comprises a storage device configured to store data about a plurality of subscribers of a service, the data including a quantity of resources available to each subscriber in the plurality of subscribers, and a server communicatively coupled with the storage device. The server is configured to receive a request to authorize a subscriber of a service to consume a quantity of the service, where a cost of consuming the quantity of the service at the time of receiving the request is C1; determine a time of a service pricing change, where a cost of consuming the quantity of the service after the time of the service pricing change is C2; and determine a quantity of resources available to the subscriber, where the quantity of resources is at least C1. The server is further configured to calculate a delay time period for the subscriber based on the quantity of resources available to the subscriber, and authorize the subscriber to consume the quantity of service. In various embodiments, the authorization is valid for a time period up to the time of the service pricing change plus the delay time period, thereby delaying a time of receipt of a reauthorization request for the subscriber beyond the time of the service pricing change by the delay time period.

In some embodiments, the system further comprises a plurality of network elements, where each network element in the plurality of network elements is communicatively coupled with the server and one or more subscriber device networks. Each network element is configured to receive service requests from the one or more subscriber device networks, and generate authorization requests based on the service requests. The authorization requests are then transmitted to the server.

According to another embodiment of the present invention, a machine-readable medium for a computer system is disclosed. The machine-readable medium includes instructions which, when executed by a processor, cause the processor to receive a request to authorize a subscriber of a service to consume a quantity of the service, where a cost of consuming the quantity of the service at the time of receiving the request is C1; determine a time of a service pricing change, where a cost of consuming the quantity of the service after the time of the service pricing change is C2; and determine a quantity of resources available to the subscriber, where the quantity of resources is at least C1. The instructions further cause the processor to calculate a delay time period for the subscriber based on the quantity of resources available to the subscriber, and authorize the subscriber to consume the quantity of service. In various embodiments, the authorization is valid for a time period up to the time of the service pricing change plus the delay time period, thereby delaying a time of receipt of a reauthorization request for the subscriber beyond the time of the service pricing change by the delay time period.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Embodiments of the present invention provide techniques for distributing the timing of reauthorization requests. The techniques described below may be applied to different domains and contexts. In one set of embodiments, the techniques may be implemented in the system of a service operator/provider to delay the receipt of reauthorization requests based on the resources available to subscribers. In this manner, the load on the system may be evened out without increasing the credit risk to the service operator/provider.

Figure 1:
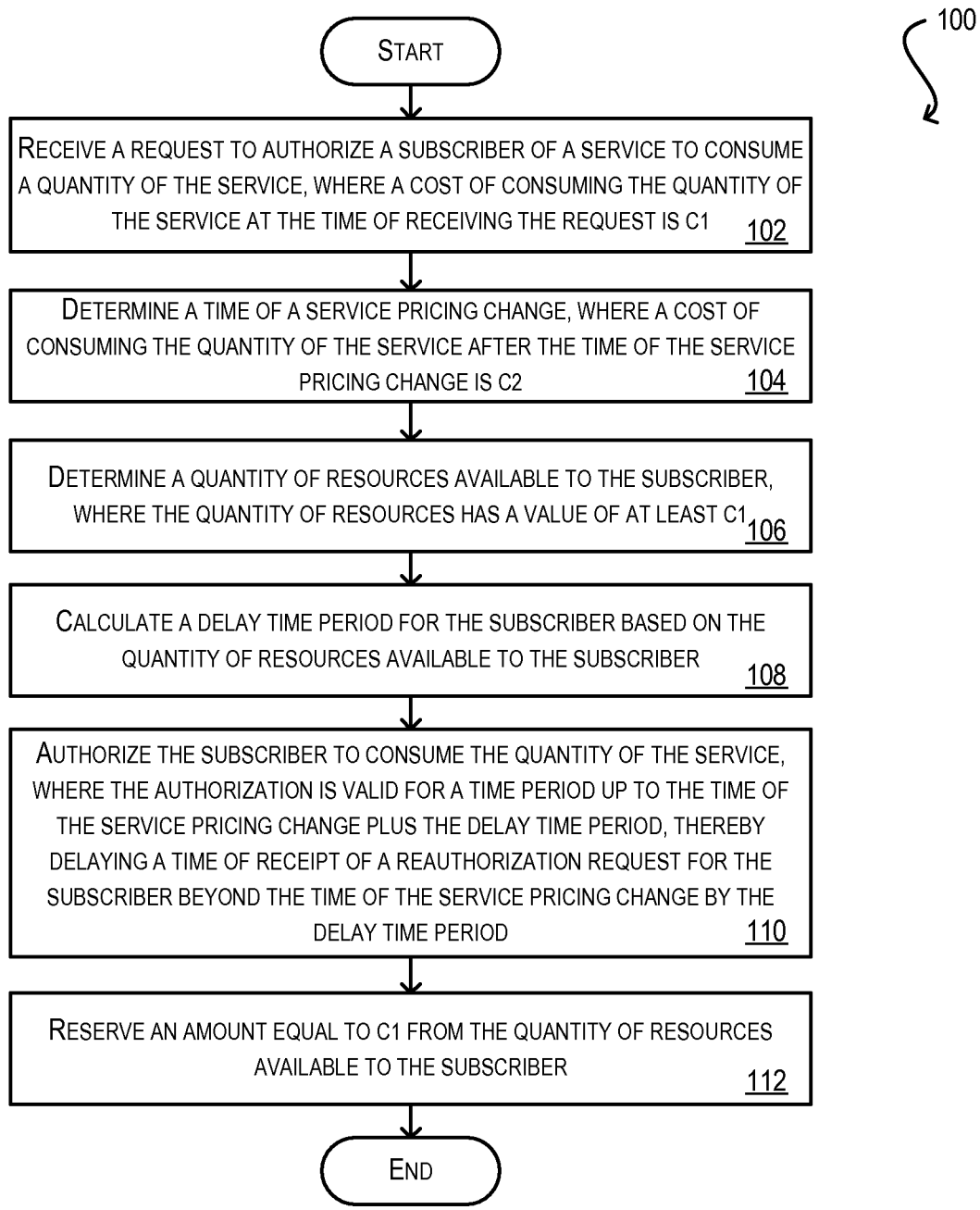
FIG. 1 is a flowchart of the steps performed in distributing the timing of reauthorization requests in accordance with an embodiment of the present invention.

FIG. 1 depicts a flowchart 100 of the steps performed in distributing the timing of reauthorization requests in accordance with an embodiment of the present invention. The processing of flowchart 100 may be implemented in software, hardware, or combinations thereof. As software, embodiments of flowchart 100 may be implemented, for example, as a plug-in to an existing application, or as a standalone program/module. Further, the software may be stored on a machine-readable medium. As hardware, embodiments of flowchart 100 may be, for example, programmed into a field-programmable gate array (FPGA) or fabricated as an application-specific integrated circuit (ASIC). One of ordinary skill in the art would recognize many variations, modifications, and alternatives.

At step 102, a request to authorize a subscriber of a service to consume a quantity of the service is received, where a cost of consuming the quantity of the service at the time of receiving the request is a value C1. In various embodiments, the service may be, for example, a telecommunications service, content delivery service, application service, or the like. Further, the subscriber may be a pre-paid or post-paid customer of the service. In one set of embodiments, the authorization request may be received directly from the subscriber or a device associated with the subscriber (e.g., cellular phone, PDA, personal computer, etc.). In other embodiments, the authorization request may be received from an intermediary on behalf of the subscriber, such as a network element or router within the service operator/provider's network.

At step 104, a time of a service pricing change is determined, where a cost of consuming the quantity of the service after the time of the service pricing change is a value C2. The time of the service pricing change is typically determined from a pricing configuration associated with the subscriber. In one embodiment, the time of the service pricing change is predetermined, such as a time of day. In alternative embodiments, the time of the service pricing change may be dynamic. For example, the price for a video-on-demand service may change dynamically from a first price tier to a second price tier based on a current quality of service of the video stream. In an exemplary embodiment, the service pricing change applies to a plurality of subscribers of the service. This typically occurs when the plurality of subscribers share the same pricing configuration.

At step 106, a quantity of resources available to the subscriber is determined, where the quantity of resources is valued at an amount greater than or equal to C1. As used herein, "resources" may refer to monetary resources, such as dollars or credit in a subscriber account, or non-monetary resources, such as accrued units of service (e.g., free or rollover cellular phone minutes, etc.).

Once the quantity of resources is determined, a delay time period for the subscriber is calculated based on the quantity of resources (108). The subscriber is then authorized to consume the quantity of service, where the authorization is valid for a time period up to the time of the service pricing change, plus the delay time period (110). In this manner, the receipt of a reauthorization request for the subscriber is delayed beyond the time of the service pricing change by the delay time period. Generally speaking, the quantity of resources available to a subscriber reflects the subscriber's ability to pay for consumption of the service. As a result, the delay time period may be longer for subscribers with a large quantity of available resources. Conversely, the delay time period may be shorter for subscribers with a small quantity of available resources. In further embodiments, the delay time period may also depend upon one or more configurable values or thresholds. Specific techniques for calculating the delay time period are discussed with respect to FIGS. 2 and 3 below.

In some embodiments, an amount equal to C1 is reserved from the quantity of resources available to the subscriber (112). This assures that the subscriber will be able to pay for the quantity of service authorized in step 110.

It should be appreciated that the specific steps illustrated in FIG. 1 provide a particular method for distributing the timing of reauthorization requests according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
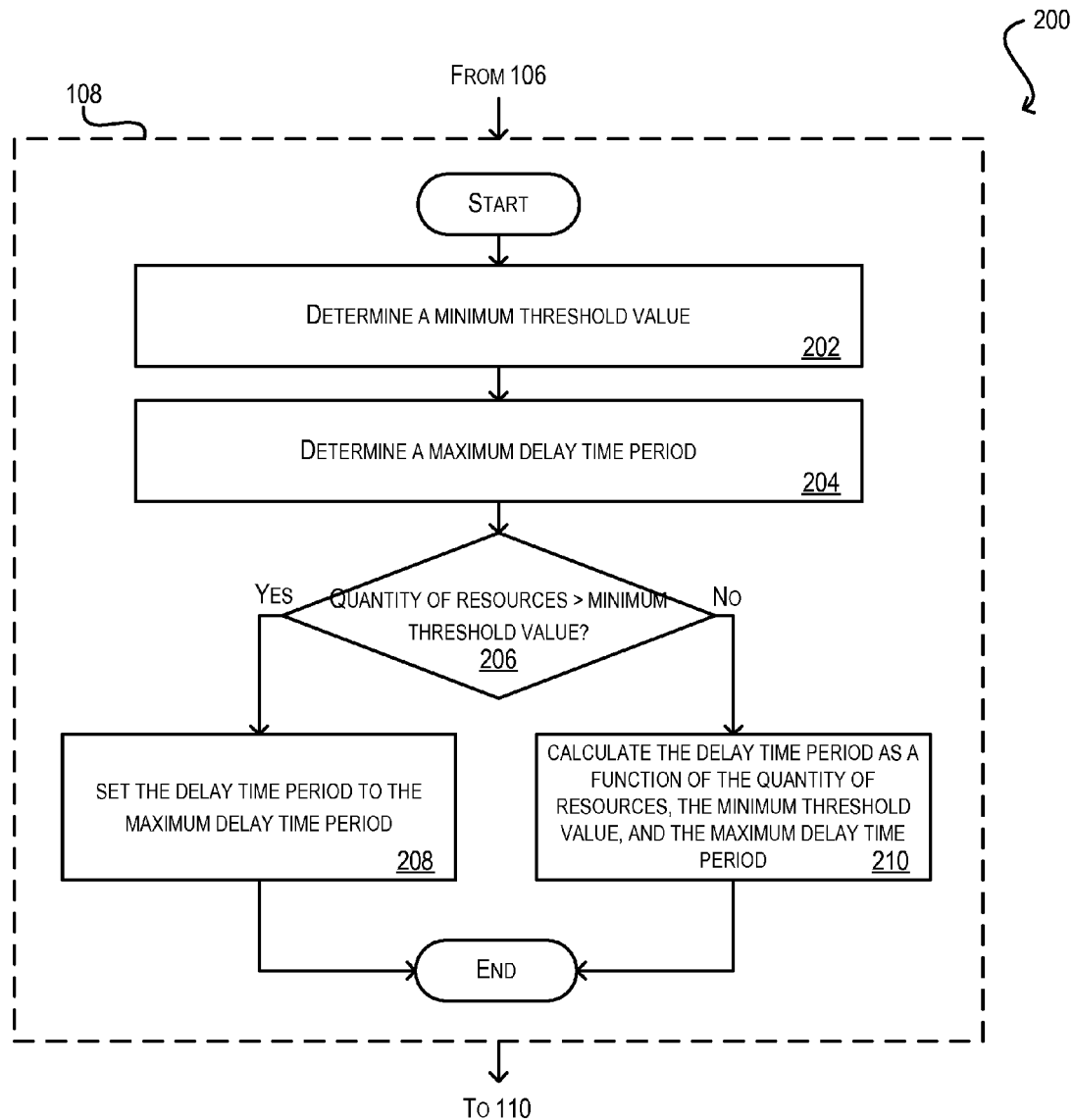
FIG. 2 is a flowchart of the steps performed in calculating a delay time period in accordance with an embodiment of the present invention.

FIG. 2 illustrates the steps performed in calculating a delay time period in accordance with an embodiment of the present invention. For example, flowchart 200 may be used to calculate a delay time period as indicated in step 108 of FIG. 1. The processing of flowchart 200 may be implemented in software, hardware, or combinations thereof. As software, embodiments of flowchart 200 may be implemented, for example, as a plug-in to an existing application, or as a standalone program/module. Further, the software may be stored on a machine-readable medium. As hardware, embodiments of flowchart 200 may be, for example, programmed into a field-programmable gate array (FPGA) or fabricated as an application-specific integrated circuit (ASIC). One of ordinary skill in the art would recognize many variations, modifications, and alternatives.

At step 202, a minimum threshold value is determined. In various embodiments, the minimum threshold represents the minimum amount of resources that must be available to a subscriber to delay a reauthorization request for the subscriber. In one set of embodiments, the minimum threshold value may be determined dynamically based on a heuristic. For example, consider a scenario where the current service price is $0.10 per MB, the next service price after a service pricing change is $1.00 per MB, and the requested quantity is 1 MB. Thus, the cost of consuming 1 MB of data at the current service price ($0.10 per MB) is $1.00, and the cost of consuming 1 MB of data at the next service price ($1.00 per MB) is $10.00. According to one possible heuristic, the maximum of these two costs (i.e., $10.00) is multiplied by the maximum number of concurrent uses of the service. For example, the maximum number of concurrent uses for an Internet access service may correspond to the maximum number of simultaneous data downloads. If the maximum number of concurrent uses is 2, then the minimum threshold value would be $10.00*2=$20.00. In general, a heuristic for determining the minimum threshold value should attempt to minimize the risk that a subscriber will be able to consume a quantity of service that she cannot pay for. At the same time, the heuristic should try to maximize the number of subscribers that will have a quantity of available resources that falls above the minimum threshold.

In alternative embodiments, the minimum threshold value may be a predetermined value. In either case, the minimum threshold value (or heuristic for determining the minimum threshold value) may be configured by a user such as a system administrator, and stored in a configuration profile.

At step 204, a maximum delay time period is determined. In various embodiments, the maximum delay time period represents that maximum period of time that a reauthorization request for a subscriber may be delayed. Like the minimum threshold value, the maximum delay time period may be determined dynamically based on a heuristic, or may be a predetermined value. Further, the maximum delay time period (or heuristic for determining the maximum delay time period) may be configured by a user such as a system administrator, and stored in a configuration profile.

If the quantity of resources available to the subscriber is greater than the minimum threshold value (206), the delay time period is set to the maximum delay time period determined in step 204 (208). In other words, subscribers with a sufficiently large amount of available resources will be delayed for the longest period. If the quantity of resources available to the subscriber is less than the minimum threshold value, the delay time period is calculated as a function of the quantity of resources, the minimum threshold value, and the maximum delay time period (210). In some embodiments, this function is a scaling function that scales the maximum delay time period by factor less than unity. One such function is discussed in detail with respect to FIG. 3 below.

It should be appreciated that the specific steps illustrated in FIG. 2 provide a particular method for calculating a delay time period according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
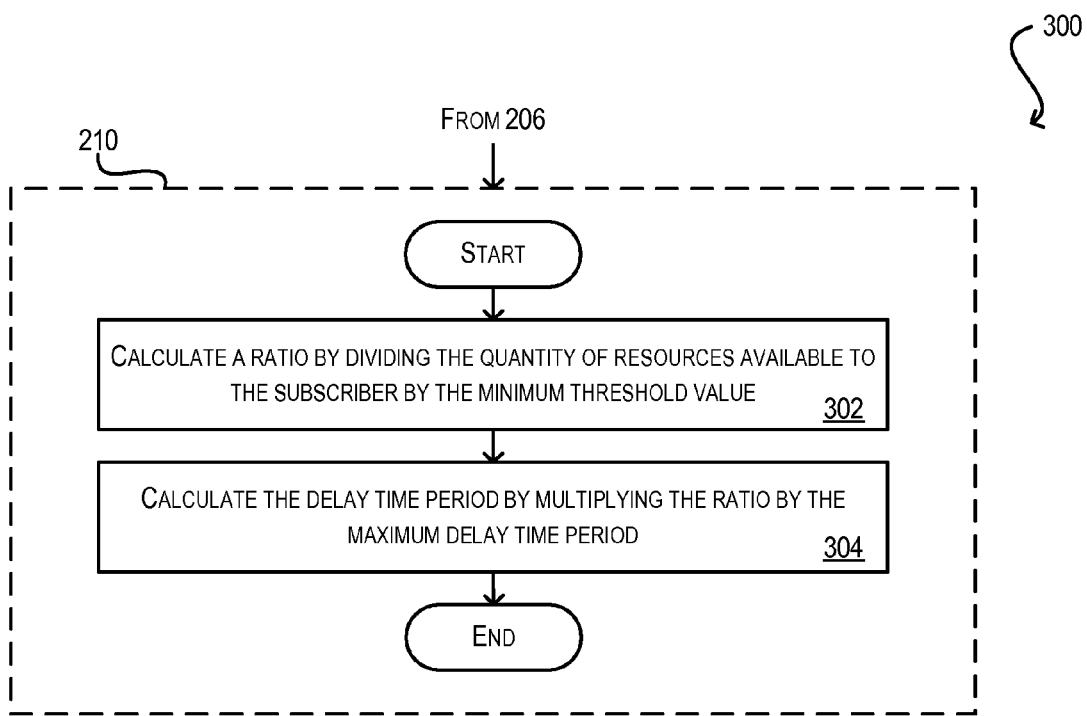
FIG. 3 is a flowchart of the steps performed in calculating a delay time period as a function of a quantity of resources available to a subscriber, a minimum threshold value, and a maximum delay time period in accordance with an embodiment of the present invention.

FIG. 3 illustrates the steps performed in calculating a delay time period as a function of the quantity of resources available to a subscriber, the minimum threshold value, and the maximum delay time period in accordance with an embodiment of the present invention. For example, flowchart 300 may be used to calculate a delay time period as indicated in step 210 of FIG. 2. The processing of flowchart 300 may be implemented in software, hardware, or combinations thereof. As software, embodiments of flowchart 300 may be implemented, for example, as a plug-in to an existing application, or as a standalone program/module. Further, the software may be stored on a machine-readable medium. As hardware, embodiments of flowchart 300 may be, for example, programmed into a field-programmable gate array (FPGA) or fabricated as an application-specific integrated circuit (ASIC). One of ordinary skill in the art would recognize many variations, modifications, and alternatives.

At step 302, a ratio is calculated by dividing the quantity of resources available to the subscriber by the minimum threshold value. In various embodiments, this ratio is a scaling factor that is used to reduce the delay time period for a subscriber from the maximum delay time period to a shorter period. According to this embodiment, if the subscriber has $5.00 available in her account and the minimum threshold value is $10.00, the ratio (i.e., scaling factor) will be $5.00/$10.00, or 0.5.

At step 304, the delay time period is calculated by multiplying the ratio by the maximum delay time period. Continuing with the example above, if the maximum delay time period is 10 minutes, the calculated delay time period will be 0.5*10 minutes, or five minutes. In this manner, the delay time period may be shortened for subscribers that have a quantity of available resources that is less than the minimum threshold value. In some embodiments, the delay time period may be reduced to zero if the quantity of available resources is sufficiently low.

It should be appreciated that the specific steps illustrated in FIG. 3 provide a particular method for calculating a delay time period as a function of the quantity of resources available to a subscriber, the minimum threshold value, and the maximum delay time period according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
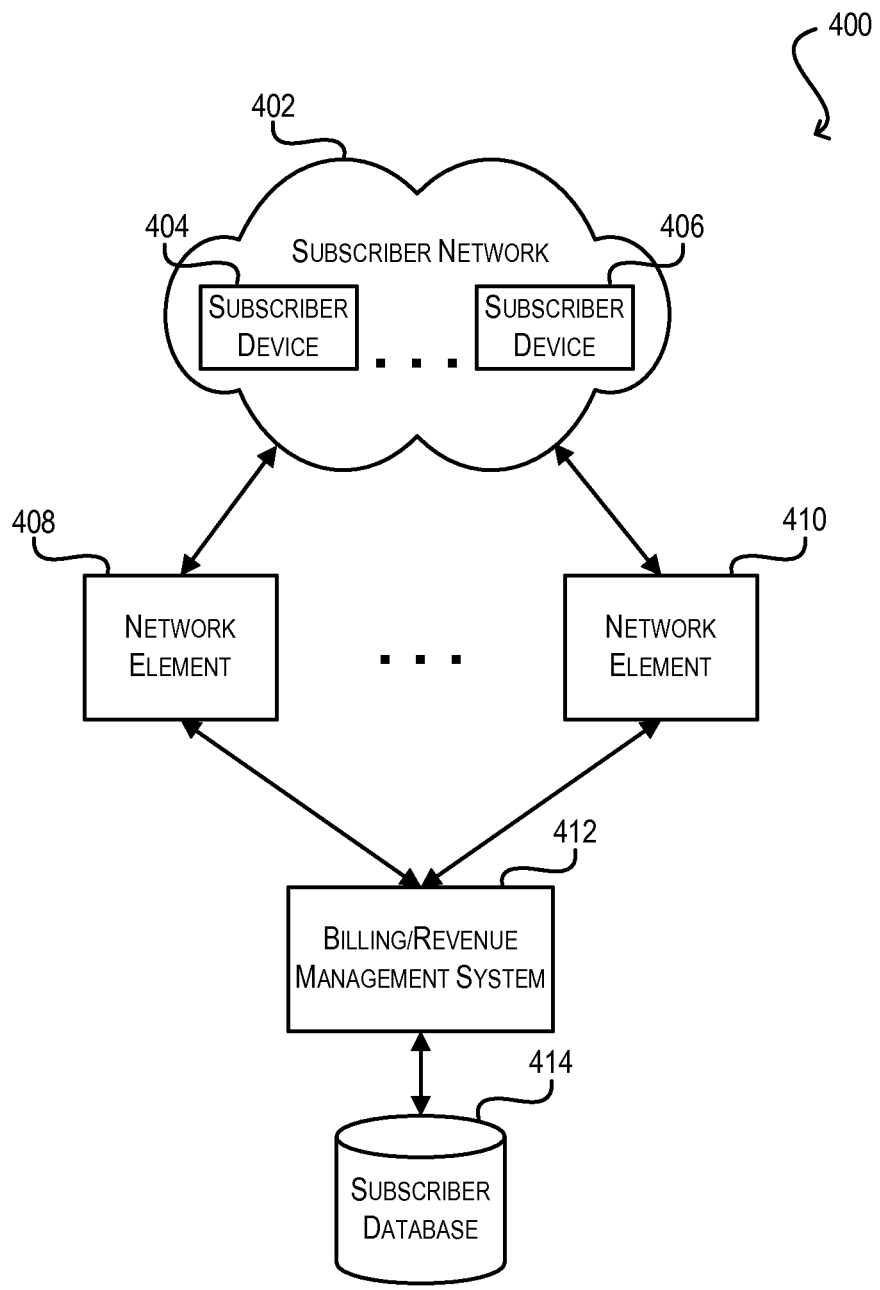
FIG. 4 is a simplified block diagram of an exemplary system environment that may be used in accordance with an embodiment of the present invention.

FIG. 4 is a simplified block diagram of an exemplary system environment 400 which may be used in accordance with an embodiment of the present invention. As shown, system environment 400 includes a subscriber network 402 comprising subscriber devices 404, 406. In one set of embodiments, subscriber devices 404, 406 represent any type of device that may be used to receive and/or request a service. For example, subscriber devices 404, 406 may be general-purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). Alternatively, subscriber devices 404, 406 may be any other electronic device, such as a thin-client computer, Internet-enabled gaming system, and/or personal messaging device, capable of communicating via a network. Although exemplary system environment 400 is shown with two subscriber devices, any number of subscriber devices may be supported.

Subscriber network 400 may be any type of network familiar to those skilled in the art that can support data communications using any of a variety of commercially-available protocols, including without limitation TCP/IP, SNA, IPX, AppleTalk, and the like. Merely by way of example, network 400 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a cellular network (e.g., CDMA, GSM, etc.); a wireless network (e.g., a network operating under any of the IEEE 802.11 suite of protocols, the Bluetooth protocol known in the art, and/or any other wireless protocol); and/or any combination of these and/or other networks.

Subscriber network 402 may be communicatively coupled with one or more network elements 408, 410, which may be specialized network devices (e.g., routers, switches, etc.), or general-purpose computers. In one embodiment, network elements 408, 410 are configured to receive service requests from subscriber devices 404, 406, generate authorization/reauthorization requests based on those service requests, and transmit the authorization/reauthorization requests to billing/revenue management system 412 for processing. In various embodiments, network elements 408, 410 are further configured to receive a response from billing/revenue management system 412 and provision services to subscriber devices 404, 406 accordingly. Although exemplary system environment 400 is shown with two network elements, any number of network elements may be supported.

System environment 400 also includes a billing/revenue management system 412, which may be a general-purpose computer, specialized server computer (including, merely by way of example, a PC server, UNIX server, mid-range server, mainframe, rack-mounted server, etc.), server farm, server cluster, or any other appropriate arrangement and/or combination. In various embodiments, billing/revenue management system 412 is configured to run an application for distributing the timing of reauthorization requests as described in the foregoing disclosure.

Billing/revenue management system 412 may run an operating system including any of those discussed above, as well as any commercially-available server operating systems. Billing/revenue management system 412 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

As shown, billing/revenue management system 412 is communicatively coupled with a subscriber database 414. In various embodiments, subscriber database 414 is configured to store information about a plurality of service subscribers, include information about the quantity of resources available to each subscriber. Subscriber database 414 may reside in a variety of locations. For example, subscriber database 414 may reside on a storage medium local to (and/or resident in) billing/revenue management system 412, or remote from system 412. In one set of embodiments, database 414 may reside in a storage-area network ("SAN") familiar to those skilled in the art. In some embodiments, subscriber database 414 may be a relational database, such as Oracle 10g, that is adapted to store, update, and retrieve data in response to SQL-formatted commands. Further, subscriber database 414 may be stored in a single logical database or across multiple logical databases, and in a single physical storage medium or across multiple physical storage mediums.

Figure 5:
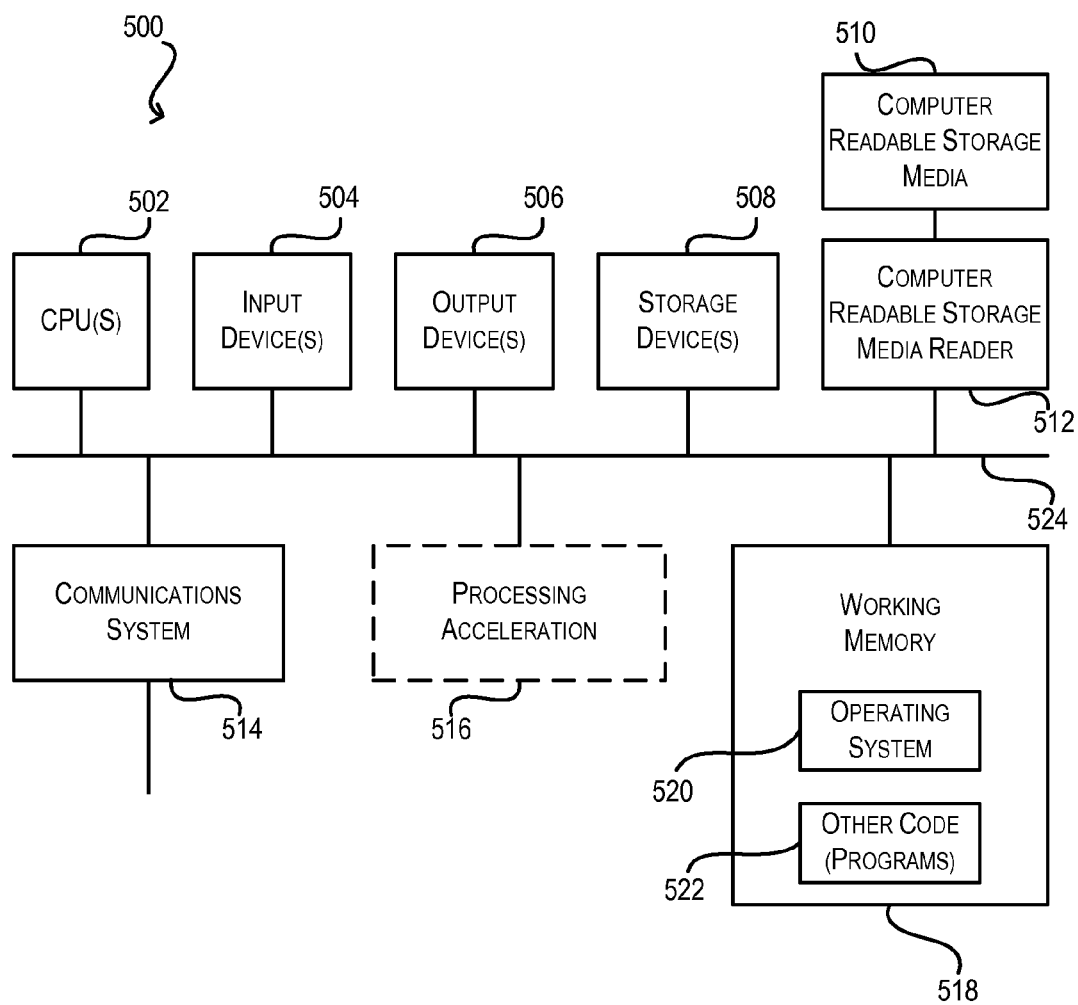
FIG. 5 is a simplified block diagram of an exemplary computer system that may used in accordance with an embodiment of the present invention.

FIG. 5 illustrates an exemplary computer system 500 which may be used in accordance with an embodiment of the present invention. The system 500 may be used to implement any of the computer systems/devices described in system environment 400. Computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 may include devices such as disk drives, optical storage devices, solid-state storage devices such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. The communications system 514 may permit data to be exchanged with a network and/or any other network-enabled device. For example, computer system 500 may be part of a larger system/network environment including a plurality of interconnected computer systems.

The computer system 500 may also comprise software elements, shown as being currently located within a working memory 518, including an operating system 520 and/or other code 522, such as an application program in accordance with embodiments of the present invention. It should be appreciated that alternative embodiments of a computer system 500 may have numerous variations from that described above. For example, customized hardware might also be used and/or particular elements might be implemented in hardware, software, or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, one of ordinary skill in the art will appreciate other ways and/or methods to implement the various embodiments.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
authorizing, by a computer system, a subscriber of a service to consume a quantity of the service, the authorizing being performed prior to allowing consumption of the service and comprising:
receiving, by the computer system, a request to authorize the subscriber to consume the quantity of the service, wherein a cost of consuming the quantity of the service at the time of receiving the request is $C1$;
determining, by the computer system, a time of a service pricing change, wherein a cost of consuming the quantity of the service after the time of the service pricing change is $C2$;
determining, by the computer system, a quantity of resources available to the subscriber for paying for the service, wherein the quantity of resources has a value of at least $C1$; and
calculating, by the computer system, a delay time period for the subscriber based on the quantity of resources available to the subscriber, the delay time period being configured to delay a time of receipt of a reauthorization request for the subscriber beyond the time of the service pricing change by the delay time period,
wherein the authorization is valid for a time period up to the time of the service pricing change plus the delay time period.

2. The method of claim 1, wherein calculating the delay time period for the subscriber based on the quantity of resources available to the subscriber comprises:
determining a minimum threshold value;
determining a maximum delay time period;
if the quantity of resources is greater than the minimum threshold value, setting the delay time period to the maximum delay time period; and
if the quantity of resources is less than the minimum threshold value, calculating the delay time period as a function of the quantity of resources, the minimum threshold value, and the maximum delay time period.

3. The method of claim 2, wherein calculating the delay time period as a function of the quantity of resources, the minimum threshold value, and the maximum delay time period comprises:
calculating a ratio by dividing the quantity of resources by the minimum threshold value; and calculating the delay time period by multiplying the ratio by the maximum delay time period.

4. The method of claim 2, wherein the minimum threshold value and maximum delay time period are configurable by an administrator.

5. The method of claim 2, wherein the minimum threshold value is calculated based on the cost of consuming the quantity of the service at the time of receiving the authorization request and the cost of consuming the quantity of the service after the time of the service pricing change.

6. The method of claim 1 wherein the authorizing further comprises reserving an amount equal to C1 from the quantity of resources available to the subscriber.

7. The method of claim 1, wherein the resources correspond to monetary resources.

8. The method of claim 1, wherein the resources correspond to units of service.

9. The method of claim 1, wherein the quantity of resources available to the subscriber correspond to a balance in an account of the subscriber.

10. The method of claim 1, wherein the service is selected from a group consisting of: a telecommunications service, a content delivery service, and an Internet access service.

11. The method of claim 1, wherein the time of the service pricing change is predetermined.

12. The method of claim 1, wherein the time of the service pricing change changes dynamically based on a quality of the service.

13. The method of claim 1, wherein the service pricing change applies to a plurality of subscribers of the service.

14. A system comprising:
a storage device configured to store data about a plurality of subscribers of a service, the data including a quantity of resources available to each subscriber in the plurality of subscribers; and
a server communicatively coupled with the storage device, the server configured to authorize a subscriber in the plurality of subscribers to consume a quantity of the service, the authorizing being performed prior to allowing consumption of the service and comprising:
receiving a request to authorize the subscriber to consume the quantity of the service, wherein a cost of consuming the quantity of the service at the time of receiving the request is C1;
determining a time of a service pricing change, wherein a cost of consuming the quantity of the service after the time of the service pricing change is C2;
determining, from the storage device, a quantity of resources available to the subscriber for paying for the service, wherein the quantity of resources available to the subscriber has a value of at least C1; and
calculating a delay time period for the subscriber based on the quantity of resources available to the subscriber, the delay time period being configured to delay a time of receipt of a reauthorization request for the subscriber beyond the time of the service pricing change by the delay time period,
wherein the authorization is valid for a time period up to the time of the service pricing change plus the delay time period.

15. The system of claim 14 further comprising a plurality of network elements, wherein each network element in the plurality of network elements is communicatively coupled with the server and one or more subscriber device networks, and wherein each network element is configured to:
receive service requests from the one or more subscriber device networks;
generate authorization requests based on the service requests; and
transmit the authorization requests to the server.

16. The system of claim 14, wherein calculating the delay time period for the subscriber based on the quantity of resources available to the subscriber comprises:
determining a minimum threshold value;
determining a maximum delay time period;
if the quantity of resources is greater than the minimum threshold value, setting the delay time period to the maximum delay time period; and
if the quantity of resources is less than the minimum threshold value, calculating the delay time period as a function of the quantity of resources, the minimum threshold value, and the maximum delay time period.

17. A non-transitory machine-readable medium having stored thereon program code executable by a processing component, the program code comprising:
code that causes the processing component to authorize a subscriber of a service to consume a quantity of the service, the authorizing being performed prior to allowing consumption of the service and comprising:
receiving a request to authorize the subscriber to consume the quantity of the service, wherein a cost of consuming the quantity of the service at the time of receiving the request is C1;
determining a time of a service pricing change, wherein a cost of consuming the quantity of the service after the time of the service pricing change is C2;
determining a quantity of resources available to the subscriber for paying for the service, wherein the quantity of resources has a value of at least C1; and
calculating a delay time period for the subscriber based on the quantity of resources available to the subscriber, the delay time period being configured to delay a time of receipt of a reauthorization request for the subscriber beyond the time of the service pricing change by the delay time period,
wherein the authorization is valid for a time period up to the time of the service pricing change plus the delay time period.

18. The non-transitory machine-readable medium of claim 17, wherein calculating the delay time period for the subscriber based on the quantity of resources available to the subscriber comprises:
determining a minimum threshold value;
determining a maximum delay time period;
if the quantity of resources is greater than the minimum threshold value, setting the delay time period to the maximum delay time period; and
if the quantity of resources is less than the minimum threshold value, calculating the delay time period as a function of the quantity of resources, the minimum threshold value, and the maximum delay time period.

* * * * *